US009382344B2

(12) United States Patent
Ho et al.

(10) Patent No.: US 9,382,344 B2
(45) Date of Patent: Jul. 5, 2016

(54) MITIGATION OF CATALYST INHIBITION IN OLEFIN POLYMERIZATION

(71) Applicant: ExxonMobil Chemical Patents Inc., Baytown, TX (US)

(72) Inventors: Suzzy C. Ho, Princeton, NJ (US); Jo Ann M. Canich, Houston, TX (US); Machteld M. Mertens, Flemington, NJ (US); Periagaram S. Ravishankar, Kingwood, TX (US); Patrick S. Byrne, Baton Rouge, LA (US); Lisa B. V. Stefaniak, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 263 days.

(21) Appl. No.: 14/311,171

(22) Filed: Jun. 20, 2014

(65) Prior Publication Data

US 2014/0378732 A1 Dec. 25, 2014

Related U.S. Application Data

(60) Provisional application No. 61/838,919, filed on Jun. 25, 2013.

(30) Foreign Application Priority Data

Aug. 1, 2013 (EP) ..................................... 13178917

(51) Int. Cl.
*C07C 2/06* (2006.01)
*C07C 2/08* (2006.01)
(Continued)

(52) U.S. Cl.
CPC ... *C08F 6/00* (2013.01); *C08F 2/00* (2013.01); *C08F 2/01* (2013.01); *C08F 6/02* (2013.01); *C08F 36/04* (2013.01); *Y02P 20/582* (2015.11)

(58) Field of Classification Search
CPC .......................................................... C07C 2/06
USPC .................................. 585/504, 518, 519, 903
See application file for complete search history.

(56) References Cited

U.S. PATENT DOCUMENTS

| 2,653,959 A | 9/1953 | Moore et al. |
| 2,943,105 A | 6/1960 | Caruthers |

(Continued)

FOREIGN PATENT DOCUMENTS

| EP | 1 022 056 | 7/2000 |
| WO | WO 02/06188 | 1/2002 |

(Continued)

OTHER PUBLICATIONS

Yu G. Osokin, Petroleum Chemistry, vol. 47, No. 1, pp. 1-11.

(Continued)

*Primary Examiner* — Thuan D Dang
(74) *Attorney, Agent, or Firm* — Catherine L. Bell; Stephen A. Baehl

(57) ABSTRACT

This disclosure relates to a process for polymerization comprising providing a recycle stream, wherein the recycle stream comprises one or more $C_6$ to $C_{12}$ conjugated or non-conjugated diene monomers and one or more $C_1$ to $C_{40}$ oxygenates. The recycle stream is contacted with an adsorbent bed to produce a treated recycle stream; wherein the adsorbent bed comprises at least two adsorbents to remove quenching agent and $C_1$ to $C_{40}$ oxygenates.

24 Claims, 10 Drawing Sheets

(51) Int. Cl.
*C08F 6/00* (2006.01)
*C08F 2/00* (2006.01)
*C08F 2/01* (2006.01)
*C08F 36/04* (2006.01)
*C08F 6/02* (2006.01)

(56) References Cited

U.S. PATENT DOCUMENTS

| | | |
|---|---|---|
| 3,117,095 A | 1/1964 | Brown et al. |
| 3,489,808 A | 1/1970 | Eberly |
| 3,931,350 A | 1/1976 | Sparks |
| 4,337,156 A | 6/1982 | deRosset |
| 5,245,107 A | 9/1993 | Yon et al. |
| 5,326,855 A | 7/1994 | Kahn |
| 5,338,824 A | 8/1994 | Diaz et al. |
| 5,427,689 A | 6/1995 | Kallenbach et al. |
| 6,051,631 A | 4/2000 | Hottovy |
| 6,111,162 A | 8/2000 | Rossini et al. |
| 6,118,037 A | 9/2000 | Piccoli et al. |
| 6,632,766 B2 | 10/2003 | Kanazirev |
| 6,790,344 B1 | 9/2004 | Min et al. |
| 6,987,152 B1 | 1/2006 | Eisinger et al. |
| 7,102,044 B1 | 9/2006 | Kulprathipanja et al. |
| 7,141,630 B2 | 11/2006 | Vizzini et al. |
| 7,141,631 B2 | 11/2006 | Murakami et al. |
| 7,326,821 B2 | 2/2008 | Risch et al. |
| 7,368,618 B2 | 5/2008 | Kulprathipanja et al. |
| 7,576,248 B2 | 8/2009 | Kulprathipanja et al. |
| 2002/0147377 A1 | 10/2002 | Kanazirev |
| 2004/0072972 A1 | 4/2004 | Vizzini et al. |
| 2004/0254416 A1 | 12/2004 | Risch et al. |
| 2009/0312511 A1 | 12/2009 | Ramage et al. |
| 2010/0197989 A1 | 8/2010 | Ducreux et al. |
| 2011/0079145 A1 | 4/2011 | Dolan et al. |

FOREIGN PATENT DOCUMENTS

| | | |
|---|---|---|
| WO | WO 2008/010962 | 1/2008 |
| WO | WO 2008/013519 | 1/2008 |
| WO | WO 2009/010666 | 1/2009 |

OTHER PUBLICATIONS

Shchapin et al., Petroleum Chemistry, vol. 48, No. 1, pp. 71-82.

MITIGATION OF CATALYST INHIBITION IN OLEFIN POLYMERIZATION

CROSS REFERENCE TO RELATED APPLICATIONS

This application claims the benefit of priority to U.S. Provisional Application No. 61/838,919, filed Jun. 25, 2013, and EP Application No. 13178917.4, filed Aug. 1, 2013, the disclosures of which are fully incorporated herein by reference.

FIELD OF THE INVENTION

The present disclosure relates to the reduction of oxygenate contaminates in a recycle stream to a polymerization reactor, and in particular, to reducing $C_1$ to $C_{40}$ oxygenates in a recycle stream to a polymerization reactor where diene monomers are present.

BACKGROUND OF THE INVENTION

It is well known that certain polymerization processes, especially olefin polymerization processes, are sensitive to poisons that can reduce the catalyst activity. There are commercially available adsorbents that can be used to treat the various streams of materials going into the polymerization reactor. It was disclosed in WO 2004/033507 that dual adsorbents can be used to remove impurities from a cycle stream in a polymerization process. However, the inventors have surprisingly found that certain non-conjugated diene monomers may react with components of the polymerization reactor to form undesirable oxygenates. It would be desirable to reduce or eliminate such oxygenates that otherwise poison the catalyst.

Other background references include: U.S. Pat. Nos. 2,653,959; 2,943,105; 3,489,808; 3,931,350; 4,337,156; 5,245,107; 5,326,855; 5,427,689; 6,051,631; 6,111,162; 6,118,037; 6,632,766; 6,790,344; 6,987,152; 7,102,044; 7,141,630; 7,141,631; 7,326,821; 7,368,618; and 7,576,248; U.S. Patent Application Publication Nos. 2002/147377; 2004/0254416; 2009/0312511; 2010/0197989; and 2011/0079145; European Patent Application Publication No. 1022056A; PCT Publication Nos. WO 2002/06188; WO 2008/010962; WO 2008/013519; and WO 2009/010666; and Yu G. Osokin, 47, PETROLEUM CHEMISTRY, pp. 1-11 (2007), and 48, PETROLEUM CHEMISTRY, pp. 271-82 (2008).

SUMMARY OF THE INVENTION

This disclosure relates to a process for polymerization comprising providing a recycle stream, wherein the recycle stream comprises one or more $C_6$ to $C_{12}$ conjugated or non-conjugated diene monomers and one or more $C_1$ to $C_{40}$ oxygenates; contacting at least a portion of the recycle stream with an adsorbent bed to produce a treated recycle stream, where the adsorbent bed comprises at least two adsorbents to remove excess quenching agent and/or $C_1$ to $C_{40}$ oxygenates; contacting the treated recycle stream with polymerization catalyst to produce a polyolefin product stream; quenching the polyolefin product stream with a quenching agent selected from water and/or a $C_1$ to $C_8$ alcohol; and separating the quenched polyolefin stream into a polyolefin product and the recycle stream. In embodiments where the quenching agent comprises water, desirable adsorbents for removing water from the recycle stream include molecular sieves which comprise zeolitic materials, and desirable adsorbents for removing the oxygenates, especially $C_8$ to $C_{20}$ oxygenates, include a hybrid zeolitic material in alumina, or high purity silica, and optionally, with the addition of another alumina adsorbent.

DETAILED DESCRIPTION

Figure 1:
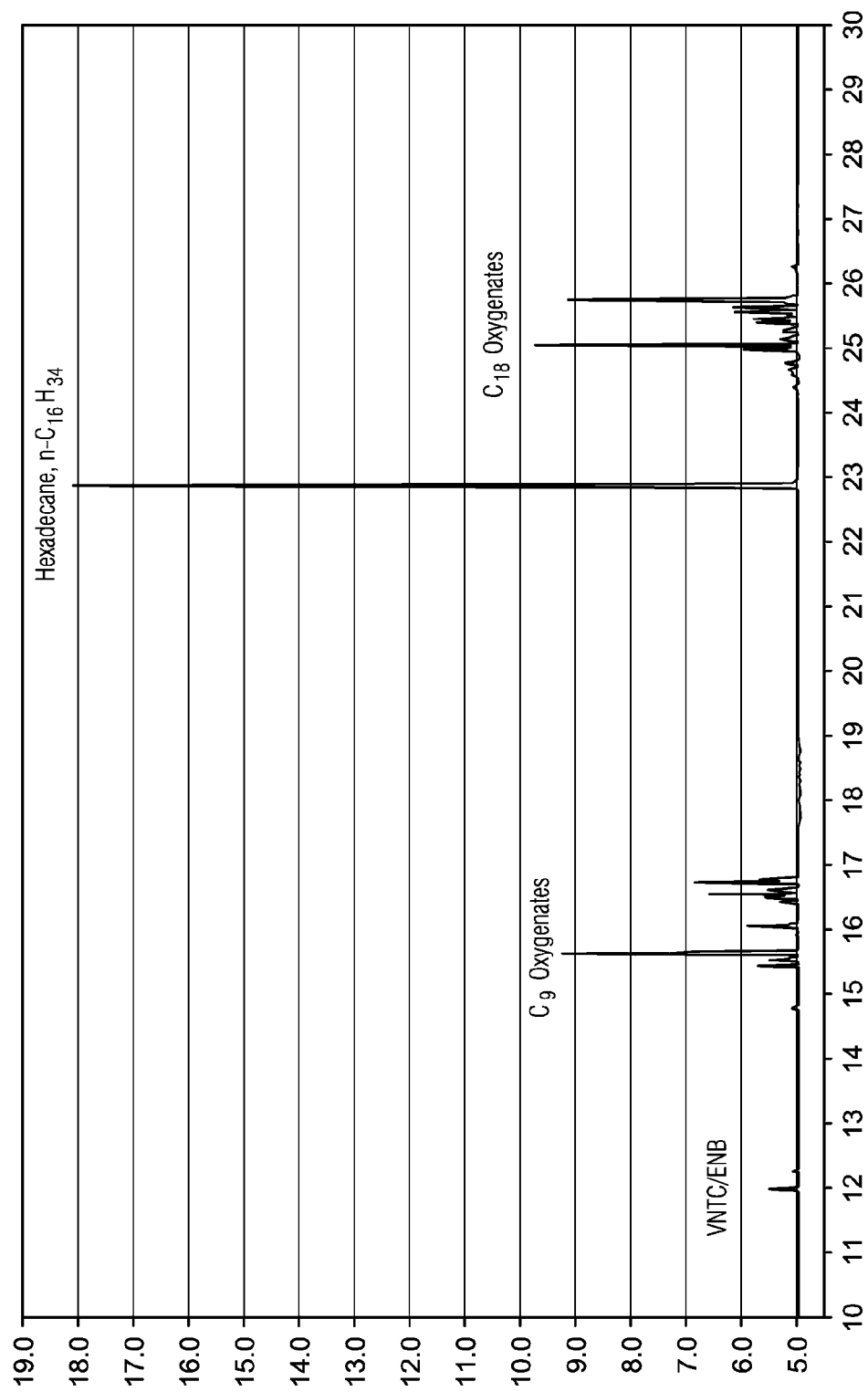
FIG. 1 represents a gas chromatogram of $C_9$ oxygenates and $C_{18}$ oxygenates with n-hexadecane as internal standard, where ENB is ethylidene norbornene and VNTC is 1-vinyl-nortricyclene (an ENB isomer).

The present invention(s) is directed to the reduction or elimination of catalyst poisons from a stream, preferably a recycle stream, entering a polyolefin polymerization reactor. In particular, in the production of polymers that include conjugated or non-conjugated diene monomers, such as ethylidene norbornene, the inventors have found that during the quenching of the reaction product and subsequent removal of quenching agent, such as water, with molecular sieves, that undesirable organic oxygenates ("oxygenates", including aldehydes, carboxylates, alcohols, ketones, esters, and ethers) are formed that later find their way into the polymerization reactor in the recycle stream and reduce the catalyst activity. The inventors have found a combination of adsorbents, preferably solid adsorbents, that will remove the quenching agent as well as the higher molecular weight oxygenates from the recycle stream entering the reactor.

Described herein is a process for polymerization comprising providing a reactor effluent, such as a polyolefin product stream, that is "washed" or "quenched" with a quenching agent selected from water, a $C_1$ to $C_8$ alcohol (preferably methanol, ethanol, propanol, and/or octanol), and mixtures thereof, to produce a quenched polyolefin stream, which is then separated into a polyolefin product and a recycle stream. At least a portion of the recycle stream, preferably all of the recycle stream, that contains quenching agent, unreacted monomers, such as one or more $C_6$ to $C_{12}$ diene monomers (conjugated or non-conjugated), and one or more $C_1$ to $C_{40}$ oxygenates, or $C_4$ to $C_{30}$ oxygenates, is contacted with an adsorbent bed to produce a treated recycle stream, which is then contacted with polymerization catalyst to produce a polyolefin product stream, where the cycle can then be repeated. Desirably, the adsorbent bed comprises at least two adsorbents to remove excess quenching agent and/or $C_1$ to $C_{40}$ oxygenates, or $C_4$ to $C_{30}$ oxygenates, or $C_8$ to $C_{20}$ oxygenates, or $C_9$ and $C_{18}$ oxygenates.

The oxygenate in the recycle stream may derive from many sources. As a particular example of a source, the oxygenate in the recycle stream is the reaction product of a $C_6$ to $C_{12}$ conjugated or non-conjugated diene monomer, the quenching agent, and an aluminum alkyl adduct from the polymerization reaction. For example, the combination of an acidic environment and the dienes and water will generate oxygenates, in particular, $C_8$ to $C_{20}$ oxygenates, or $C_9$ and $C_{18}$ oxygenates.

The oxygenates, in some aspects, may also derive from the reaction of the $C_6$ to $C_{12}$ conjugated or non-conjugated diene monomer with the adsorbent, such as a zeolitic material, used to remove the quenching agent from the recycle stream. For example, the $C_6$ to $C_{12}$ conjugated or non-conjugated diene monomer may react with the acidic environment of the binder in the adsorbent, such as a zeolitic material, to form oxygenates.

The oxygenate in the recycle stream may depend on the type of quenching agent and the diene being used. For example, the recycle stream may comprise a $C_{m+n}$ oxygenate, where m is the number of carbon atoms from the quenching agent and n is the number of carbon atoms in the conjugated diene monomer, the dimer of the conjugated monomer, and oligomers of either with ethylene and/or propylene. Therefore, m is 0 if the quenching agent is water and when the quenching agent is a $C_{1-8}$ alcohol, m is an integer from 1 to 8 corresponding to the number of carbons in the alcohol used (e.g., if methanol is used m=1, if propanol is used m=3, if octanol is used m=8). Therefore, when the diene is ethylidene norbornene, n is typically equal to 9 or 18. Thus, when the diene is ethylidene norbornene or an E NB-isomer and water is used as the quenching agent, the recycle stream may comprise $C_9$ and/or $C_{18}$ oxygenates. Alternatively, when the diene is ethylidene norbornene or an e NB-isomer and methanol is used as the quenching agent, the recycle stream may comprise $C_{10}$ and/or $C_{19}$ oxygenates. Likewise, if the diene is ethylidene norbornene or an e NB-isomer and propanol is used as the quenching agent, the recycle stream may comprise $C_{12}$ and/or $C_{21}$ oxygenates.

The "quenching" step preferably takes place in a vessel or reactor separate from the adsorbent bed. This process is well known in the art and refers to the contacting of the quenching agent with the reactor effluent, wherein both the quenching agent and reactor effluent can be in the liquid state, the vapor state, or where one may be a liquid and the other a vapor. This process is used to control temperature of the effluent as well as stop the polymerization process, and may further include separating out the various components in the reactor effluent. Desirably, the polymer is separated out from the polyolefin product stream, leaving the recycle stream that is contacted with the at least two adsorbents in order to remove the residual quenching agent and oxygenates. A high pressure separator may be used before this step to remove a portion of the quenching agent and oxygenates, leaving the adsorbent bed to remove the remainder of the quenching agent and oxygenates.

The "adsorbent bed" refers to the collection of materials, solid, liquid, gel, or other physical form, that is used to contact with the reactant or recycle stream of materials that will include the undesirable oxygenate. Preferably, the adsorbent bed includes at least two, preferably two or three, adsorbents that are stationary or otherwise fixed in the bed. The adsorbents may be spherical or cylindrical particles. The adsorbents may have an average particle size within the range from 0.5 or 1 or 2 mm to 2.5 or 3 or 4 or 5 or 6 mm, where desirable ranges may include ranges from any lower limit to any upper limit. The "at least two adsorbents" means that there are two or more, preferably two or three, adsorbents that are distinct from one another in size and/or chemical composition and their ability and capacity to adsorb quenching agent, oxygenates, or even the desirable monomers used in the polymerization process. Desirably, the adsorbents will preferentially adsorb the oxygenates and quenching agent and allow the monomers to pass through the bed without being retained in or transformed over the bed.

Figure 4:
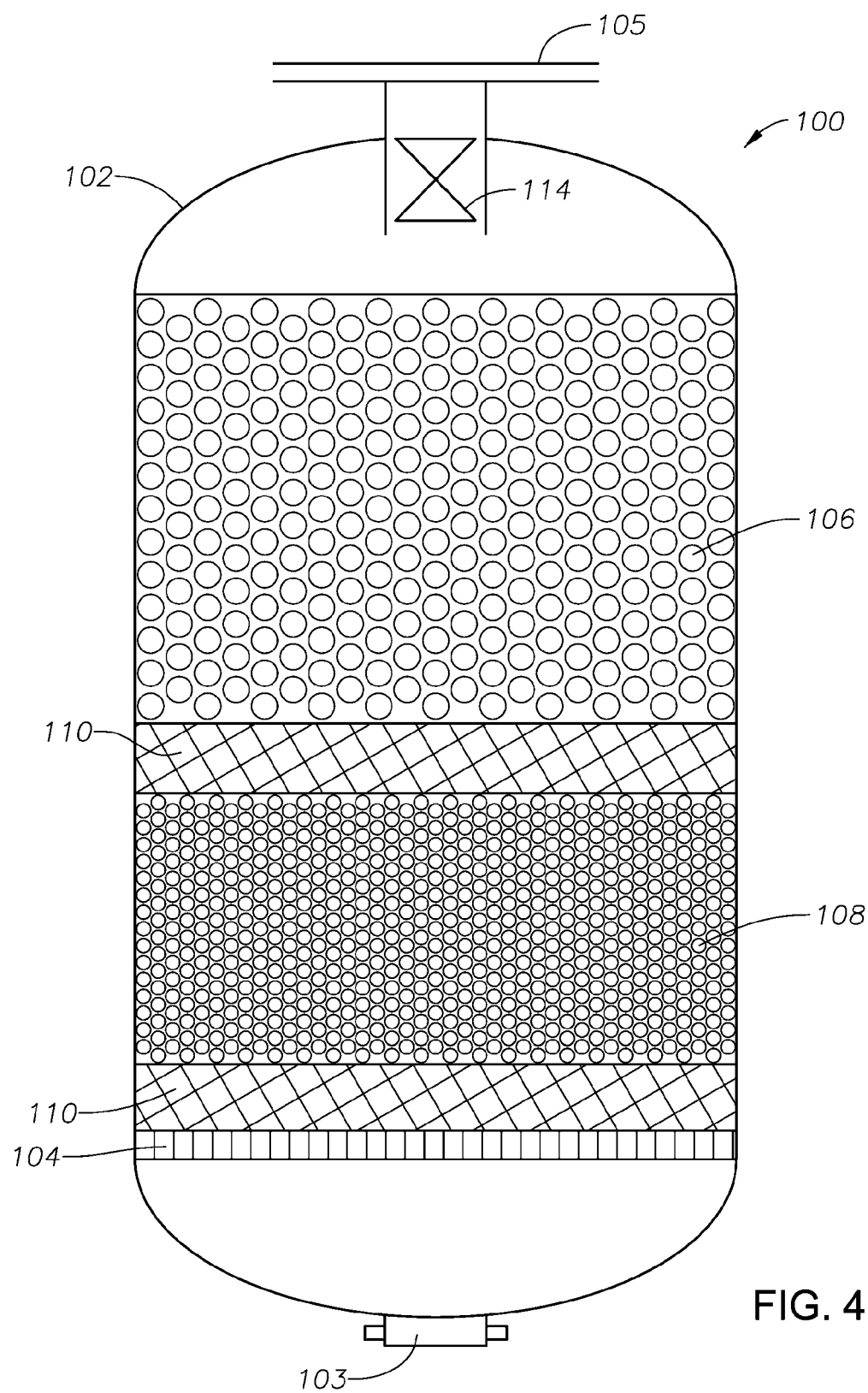
FIG. 4 is a cutaway schematic of an example adsorbent bed.

An example of how an adsorbent bed may be housed and situated is represented in FIG. 4. Preferably, the recycle stream flowing through conduit (105) that passes through the bed (100) does so on a continuous basis, or batchwise, meaning that a volume of recycle stream may enter the bed and stay for some time in contact with the bed before then being flushed out. The bed may contain the two, or three, or more adsorbents intimately mixed together or in separate zones. For example, the bed may contain two adsorbents (106) and (108) arranged in separate zones as illustrated in FIG. 4. Even further, the two, three, or more adsorbents may be separated from one another by glass, ceramic or metal "frits" or screens (110), but otherwise be in liquid communication with one another, meaning that the recycle stream, which may include not only the oxygenates and quenching agent but unreacted monomers from the polymerization process and diluent, such as hexane and/or propane, that may be used during polymerization, can flow continuously from one zone of adsorbent to another. A porous tray (104) may be used to support the adsorbent bed (100) containing adsorbents (106) and (108) or other additional zones, so the diluent carrying the unreacted monomers, oxygenates, water and residual catalyst and activator materials (e.g., aluminum alkyl adducts described below) are carried intermittently or continuously from conduit (105), through port valve (114) into the bed (100) through adsorbent (106), past screen (110), then through the second adsorbent (108), then through the second screen (110) and out the bed (100) through port (103). The port valve (114) can control the flow of recycle stream into and through the adsorbent bed (100), and port (103) could also be fitted with a valve, and the flow can be either gravity driven or driven by internally generated pressure. Either or both of valves (103) and/or (114) could be fitted with filters to capture any solids. Most preferably, adsorbent (108) is the adsorbent primarily for removing the oxygenates, and the adsorbent (106) is the adsorbent primarily for removing quenching agent from the recycle stream. Stated another way, the first zone to be contacted by recycle stream is preferably the adsorbent primarily for removing quenching agent, such as water, preferably molecular sieve and/or alumina, and the second zone to be contacted by recycle stream is preferably the adsorbent for removing the oxygenates, preferably the hybrid adsorbent. Conceivably, the flow of the recycle stream could go in the opposite direction, that is, from port (103) to port (114), in which case it is preferable if adsorbent (108) is the adsorbent primarily for quenching agent, and the adsorbent (106) is the adsorbent primarily for oxygenates.

The "residence time" of the recycle stream containing the oxygenates and water will depend on the dimensions of the bed, as contained in the vessel or drier column, as well as the particle sizes of the adsorbents, and the flow rate through the bed. The bulk density of the adsorbent is one factor, which in some embodiments may be within the range from 0.40 or 0.50 or 0.60 or 0.70 g/ml to 1.0 or 1.1. or 1.2 g/ml, where desirable ranges may include ranges from any lower limit to any upper limit. The bulk density may be different for each adsorbent also, for instance, the bulk density of the zeolitic molecular sieve may be within a range from 0.70 to 1.0 g/ml while the bulk density of the hybrid zeolite in alumina may be from 0.8 to 1.2 g/ml. In any case, the recycle stream preferably has a residence time, or time it takes the bulk solution (diluent) to flow through the at least two adsorbents, within the range of from 5 or 8 minutes to 12 or 15 or 20 minutes, where desirable ranges may include ranges from any lower limit to any upper limit; or, alternatively, the residence time for the recycle stream with each of the adsorbents, individually, is within the range of from 4 or 6 minutes to 10 or 14 or 18 minutes, where desirable ranges may include ranges from any lower limit to any upper limit, when the adsorbents are separated from one another. Based on the flow rate of the diluent in the recycle stream, which typically comprises from 80 to 90 or 95 or 98 wt % diluent, the residence time will be within the range from 0.1 or 1 or 5 or 10 kg diluent/hour to 30 or 40 or 50 kg/hour through the bed, where desirable ranges may include ranges from any lower limit to any upper limit.

Referring again to FIG. 4, the adsorbent bed (100) is preferably housed in a non-reactive vessel (102), preferably stainless steel, within the polymerization system in which it is associated with and has an port valve (114) for the recycle stream flowing through conduit (105) and port (103) for the stream exiting that has had the oxygenates and quenching agent partially or completely removed. The vessel may also have ports and ports for diluent used to regenerate the adsorbent, and the vessel may be heated, such that it heats the adsorbent contained therein. Thus, preferably, the adsorbent bed is regenerated by heating the adsorbent bed to a temperature in the range of from 150 or 180° C. to 250 or 290° C., where desirable ranges may include ranges from any lower limit to any upper limit. This may be accomplished by subjecting the adsorbent bed to a hot diluent wash, or such a wash may take place in addition to heating the bed. Further the regeneration process may comprise, additionally or in lieu of other processes, sparging the adsorbent bed with hot nitrogen.

As mentioned, it has been found that detrimental catalyst poisons are particularly formed when non-conjugated diene monomers come into contact with quenching agents and the aluminum alkyl adducts often found in polymerization product streams. By "aluminum alkyl adducts", what is meant is the reaction product of aluminum alkyls and/or alumoxanes with quenching agents, such as water and/or methanol. The aluminum alkyls may be present as scavengers in the polymerization reactor and/or as activators, as are alumoxanes, which are well known in the art.

Methods of combining olefins and other monomers with polymerization catalysts are well known in the art, and the present invention is not limited to any particular type of polymerization process. Conjugated or non-conjugated diene monomers, however, are typically present in the inventive process, either alone or with other monomers, most preferably non-conjugated dienes. Typically, non-conjugated diene monomers are selected from the group consisting of $C_6$ to $C_{12}$ non-conjugated diene monomers, which are selected from the group consisting of: 2-methyl-1,4-pentadiene, 3-methyl-1,4-pentadiene, 1,4-hexadiene, 1,5-hexadiene, 2-methyl-1,5-hexadiene 3-methyl-1,4-hexadiene, 4-methyl-1,4-hexadiene, 5-methyl-1,4-hexadiene, 1,5-heptadiene, 1,6-heptadiene, norbornadiene, 3,3-dimethyl-1,3-hexadiene, 4-ethyl-1,4-hexadiene, 5-methyl-1,4-heptadiene, 6-methyl-1,4-heptadiene, 1-vinylcyclohexene, 5-methylene-2-norbornene, 1,6-octadiene, 1,7-octadiene, 1,9-octadiene, 1,7-nondiene, 1,8-nonadiene, 5-vinyl-2-norbornene, 5-ethylidene-2-norbornene, 5-ethyl-1,4-heptadiene, 5-ethyl-1,5-heptadiene, 4-methyl-1,4-octadiene, 5-methyl-1,4-octadiene, 5-methyl-1,5-octadiene, 6-methyl-1,5-octadiene, 6-methyl-1,6-octadiene, 7-methyl-1,6-octadiene, 1,8-decadiene, 1,9-decadiene, 1,4-divinylcyclohexane, 1,3-divinylcyclohexane, dicyclopentadiene, 3,7-dimethyl-1,6-octadiene, 5,7-dimethyl-1,6-octadiene, 4-ethyl-1,4-octadiene, 5-ethyl-1,4-octadiene, 5-ethyl-1,5-octadiene, 6-ethyl-1,5-octadiene, 6-ethyl-1,6-octadiene, 4-methyl-1,4-nonadiene, 5-methyl-1,4-nonadiene, 5-methyl-1,5-nonadiene, 6-methyl-1,5-nonadiene, 6-methyl-1,6-nonadiene, 7-methyl-1,6-nonadiene, 7-methyl-1,7-nonadiene, 5-allyl-2-norbornene, 1,10-undecadiene, 6-propyl-1,6-octadiene, 4-ethyl-1,4-nonadiene, 5-ethyl-1,4-nonadiene, 5-ethyl-1,5-nonadiene, 6-ethyl-1,5-nonadiene, 6-ethyl-1,6-nonadiene, 7-ethyl-1,6-nonadiene, 5-methyl-1,4-decadiene, 5-methyl-1,5-decadiene, 6-methyl-1,5-decadiene, 6-methyl-1,6-decadiene, 7-methyl-1,6-decadiene, 7-methyl-1,7-decadiene, 8-methyl-1,7-decadiene, 8-methyl-1,8-decadiene, 9-methyl-1,8-decadiene, 1,11-dodecadiene, 6-butyl-1,6-octadiene, 5-ethyl-1,4-decadiene, 5-ethyl-1,5-decadiene, 6-ethyl-1,5-decadiene, 6-ethyl-1,6-decadiene, 7-ethyl-1,6-decadiene, 7-ethyl-1,7-decadiene, 8-ethyl-1,7-decadiene, 8-ethyl-1,8-decadiene, 6-methyl-1,6-undecadiene, 8-methyl-1,6-undecadiene, and combinations thereof.

More preferably, the $C_6$ to $C_{12}$ non-conjugated diene monomers are selected from the group consisting of: 2-methyl-1,4-pentadiene, 3-methyl-1,4-pentadiene, 1,4-hexadiene, 1,5-hexadiene, 2-methyl-1,5-hexadiene, 1,6-heptadiene, norbornadiene, 1,7-octadiene, 1-vinylcyclohexene, 1,8-nonadiene, 5-vinyl-2-norbornene, 5-ethylidene-2-norbornene, 1,9-decadiene, 3,7-dimethyl-1,6-octadiene, 5,7-dimethyl-1,6-octadiene, 1,10-undecadiene, 1,11-dodecadiene, 5-methylene-2-norbornene, 5-allyl-2-norbornene, 5-vinyl-2-norbornene, 5-ethylidene-2-norbornene, dicyclopentadiene, and combinations thereof. Most preferably, the non-conjugated diene is 5-ethylidene-2-norbornene. In any case, one or more of ethylene or $C_3$ to $C_{12}$ alpha-olefin monomers may also be contacted with the polymerization catalyst and non-conjugated diene monomer.

As mentioned, the inventive adsorbent bed comprises at least two adsorbents to remove quenching agent and/or $C_1$ to $C_{40}$ oxygenates. Preferably, at least one adsorbent is provided to remove at least the quenching agent, such as water, and at least one other adsorbent is provided to remove $C_1$ to $C_{40}$ oxygenates, or $C_8$ or $C_{40}$ oxygenates, or $C_{12}$ to $C_{30}$ oxygenates. The adsorbent for removing the quenching agent, such as water, may also remove $C_1$ to $C_8$ or $C_9$ oxygenates, understanding that there may be an overlap in what the various adsorbents will retain. Referring to FIG. 4, one adsorbent can be the adsorbent (106), and the other could be adsorbent (108), where the recycle stream contacts each in turn. Alternatively, the adsorbents (106) and (108) can be mixed together where the recycle stream contacts both simultaneously. However, given that one adsorbent may require changing out sooner than the other, it is often advantageous to have them in separate zones as illustrated in FIG. 4. The most desirable adsorbents are those that adsorb the least amount of unreacted monomer materials from the reactor and adsorb the greatest amount of oxygenates and quenching agent, such as water. Most preferably, the adsorbents should remove water, $C_9$ oxygenates, and $C_{18}$ oxygenates that tend to form in the presence of 5-ethylidene-2-norbornene.

Most preferably, at least one adsorbent is a zeolitic molecular sieve and another is a hybrid zeolite in alumina. While it is understood that many solid adsorbents will be a mixture/combination of the actual adsorbent, binder, and other materials, the "hybrid zeolite in alumina" adsorbent referred to herein is of a particular quality and description as described herein. The zeolitic molecular sieve is desirable for removing water and lower oxygenates (e.g., $C_1$ to $C_6$ oxygenates), while the hybrid zeolite in alumina is desirable for removing higher oxygenates, such as $C_8$ to $C_{40}$ oxygenates, or $C_{12}$ to $C_{30}$ oxygenates, most preferably $C_{18}$ oxygenates.

The zeolitic molecular sieve may comprise material selected from the group consisting of zeolite X, zeolite Y, zeolite A, faujasite, mordenite, ferrierite, and mixtures thereof. Zeolitic molecular sieves for removing water are well known in the art and are available from, for example, BASF and other manufacturers. The zeolitic molecular sieves preferably have a pore size within the range of from 2 or 4 Å to 6 or 8 or 10 or 12 Å, where desirable ranges may include ranges from any lower limit to any upper limit.

The "hybrid zeolite in alumina" is a zeolite that is in a matrix of alumina. The hybrid zeolite in alumina may have a surface area within the range of from 60 or 80 m$^2$/g to 110 or 120 or 140 m$^2$/g, where desirable ranges may include ranges from any lower limit to any upper limit. The hybrid zeolite in alumina may have a pore volume within the range from 0.30 or 0.35 or 0.40 ml/g to 0.48 or 0.50 or 0.54 ml/g, where desirable ranges may include ranges from any lower limit to any upper limit. A commercial example of a useful hybrid zeolite in alumina is zeolite UOP AZ-300™ from UOP.

In some embodiments, at least one of the adsorbents is binderless. For example, the zeolitic molecular sieve may be binderless and/or the hybrid zeolite in alumina may be binderless. A binderless zeolite is a zeolite that contains less than 10 wt % binder, or less than 7 wt % binder, or less than 5 wt % binder, or less than 2 wt % binder, where the binder content of the zeolite is measured by X-ray diffraction. In some embodiments, the zeolite is substantially free of binder and contains less than 2 wt % binder. Using a binderless zeolite can allow for the creation of less oxygenates in the recycle stream, as the unreacted conjugated or non-conjugated diene monomer in the recycle stream and quenching agents, can react with the binder in a zeolitic material to form oxygenates. Additionally, in addition to the benefit that substantially no oxygenates are generated by the (binder) in the zeolite body, using a binderless zeolite can provide increased capacity per weight of the material for removing water/quenching agent. An example of a binderless zeolite that may be used is Zeochem Purmol® 3ST and Zeochem Purmol® 3 STH.

Desirably, the inventive adsorbent bed may contain more than two adsorbents. In some embodiments the adsorbent bed may contain an alumina adsorbent in addition to the at least two adsorbents described above. The alumina adsorbent may be selected from calcined alumina, low soda alumina, reactive alumina, tabular alumina, fused alumina, high purity alumina, transition metal substituted alumina, silica/alumina, and mixtures thereof. Alumina may be used along with molecular sieves, especially to adsorb water and/or $C_1$ to $C_6$ oxygenates, or could be used instead of molecular sieves. A commercial example of a useful alumina adsorbent is Selexsorb™ (BASF).

Another type of adsorbent material that may be present in the bed instead of the hybrid adsorbent, or in addition to such adsorbent, is a silica, a commercial example of which is Perlkat™ (BASF). The silica adsorbent may be selected from fused quartz, crystal silica, fumed silica, colloidal silica, silica gel, aerogel, transition metal substituted silica, high purity silica, and mixtures thereof.

At least one of the two adsorbents, preferably the silica, alumina, silica-alumina, or zeolitic adsorbents is a solid and has a surface area within the range of from 50 or 80 or 120 or 150 or 200 or 250 or 300 or 350 m$^2$/g to 400 or 500 or 600 or 800 or 1000 m$^2$/g, where desirable ranges may include ranges from any lower limit to any upper limit. For example, a zeolitic adsorbent that contains binder (e.g., from 2-10 wt % zeolite with the remainder being binder, based on the weight of the zeolitic adsorbent) and has a surface area of from about 250 to 600 m$^2$/g, or from about 300 to 500 m$^2$/g, or from about 350 to about 450 m$^2$/g, may be used. For example, a binderless zeolitic adsorbent (e.g., less than 10 wt % binder, or less than 5 wt % binder, or less than 2 wt % binder, based on the weight of the zeolitic adsorbent) and has a surface area of from about 80 to about 400 m$^2$/g, or from about 100 to about 350 m$^2$/g, or from about 120 to about 300 m$^2$/g, may be used.

At least one of the two adsorbents may be a solid and have an average pore volume within the range of from 0.2 or 0.4 or 0.6 ml/g to 0.88 or 1.0 or 1.4 or 1.6 or 2.0 ml/g, where desirable ranges may include ranges from any lower limit to any upper limit. Desirable alumina or silica molecular sieves such as these may have a pore size within the range of from 12 or 20 or 30 Å to 40 or 50 or 60 or 80 Å, where desirable ranges may include ranges from any lower limit to any upper limit.

While the adsorbents described herein, alone or in combination, preferably remove all organic oxygenates, the recycle streams of the present invention particularly comprise one or more of $C_9$ and $C_{18}$ oxygenates, or $C_{10}$ and $C_{19}$ oxygenates, before contact with the adsorbent bed. Desirably, the recycle stream has 50 or 65 wt % more $C_4$ to $C_{40}$ oxygenates, most preferably $C_9$ and $C_{18}$ oxygenates or $C_{10}$ and $C_{19}$ oxygenates, than the treated recycle stream. Stated another way, the recycle stream after contact with the adsorbent bed comprises 10 or 8 or 5 or 4 ppm or less $C_4$ to $C_{40}$ oxygenates, or $C_9$ and $C_{18}$ oxygenates or the $C_{10}$ and $C_{19}$ oxygenates.

In a particularly preferred aspect of the invention, when the recycle stream is in contact with the adsorbent bed, from 70 or 80 wt % to 95 or 99 wt % of the $C_{18}$ oxygenates or $C_{19}$ oxygenates are absorbed and from 10 or 15 or 20 wt % to 35 or 40 or 45 wt % of the non-conjugated dienes are absorbed by the at least two adsorbents after at a desirable residence time at 20° C., the residence time will be within the range from 0.1 or 1 or 5 or 10 kg diluent/hour to 30 or 40 or 50 kg/hour through the bed. Also, preferably, from 80 or 85 or 90 wt % to 95 or 99 or 100 wt % of the $C_9$ oxygenates or $C_{10}$ oxygenates are adsorbed.

In preferred aspects of the invention, when the recycle stream is in contact with the adsorbent bed, from 70 to 99 wt %, or from 80 to 95 wt %, of the $C_{18+m}$ oxygenates are absorbed and from 10 to 45 wt %, or from 15 to 40 wt %, or from 20 to 35 wt %, of the non-conjugated dienes are absorbed by the at least two adsorbents, where m is equal to the number of carbon atoms in the quenching agent. In some aspects of the invention, from 80 to 100 wt %, or from 85 to 99 wt %, or from 90 to 95 wt %, of the $C_{9+m}$ oxygenates are adsorbed, where m is equal to the number of carbon atoms in the quenching agent.

The various descriptive elements and numerical ranges disclosed herein for the polymerization process, and in particular, the method of removing oxygenates and water from the recycle stream, and the adsorbents used therein, can be combined with other descriptive elements and numerical ranges to describe the invention(s); further, for a given element, any upper numerical limit can be combined with any lower numerical limit described herein. The features of the invention are described in the following non-limiting examples.

EXAMPLES

Gas Chromatography (GC)

A Perkin Elmer™ Clarus 500 gas chromatograph was used to evaluate the adsorption of selected oxygenates and monomers onto various adsorbents. The gas chromatograph method is shown below in Table 1.

TABLE 1

| Gas Chromatograph Conditions | |
|---|---|
| Gas Chromatograph Column | PerkinElmer CLARUS ™ 500 Agilent Technologies Inc. Cat. No. 19091S-001 HP-PONA 50 m × 0.200 mm, 0.50 um |

TABLE 1-continued

| Gas Chromatograph Conditions | |
| --- | --- |
| Carrier gas | Nitrogen |
| Injector | 325° C. |
| | 1:50 split ratio |
| Injection Volume | 1-4 μL |
| Concentration | 0-8000 ppm ENB, |
| | 0-5000 pm C9 Oxygenates, |
| | 0-2000 ppm C18 Oxygenates, |
| | 0-6000 ppm n-hexadecane |
| Oven temperature | 60° C. for 4 min |
| | 10° C./min up to 320° C. |
| | Total Time: 30 min |
| Detector | FID |
| | 325° C. |
| | 45 L/min Hydrogen |
| | 450 L/min Air |

A representative gas chromatogram of $C_9$ oxygenates and $C_{18}$ oxygenates with n-hexadecane as internal standard is shown in FIG. 1, where ENB is Ethylidene Norbornene and VNTC is 1-vinylnortricyclen (an ENB isomer).

Products were characterized by $^1H$ NMR and $^{13}C$ NMR as follows: A Bruker 400 MHz Advance III Spectrometer was used. Samples were dissolved in chloroform-d ($CDCl_3$) in a 5 mm NMR tube at concentrations between 10 to 15 wt % prior to being inserted into the spectrometer magnet.

$^{13}C$ NMR.

$^{13}C$ NMR data was collected at room temperature (20° C.). A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired with time averaging to provide a signal to noise level adequate to measure the signals of interest. Prior to data analysis, spectra were referenced by setting the chemical shift of the $CDCl_3$ solvent signal to 77.0 ppm.

$^1H$ NMR.

$^1H$ NMR data was collected at room temperature. Data was recorded using a maximum pulse width of 45 degree, 8 seconds between pulses and signal averaging 120 transients.

Preparation and Characterization of $C_9$ Oxygenates.

Figure 2A:
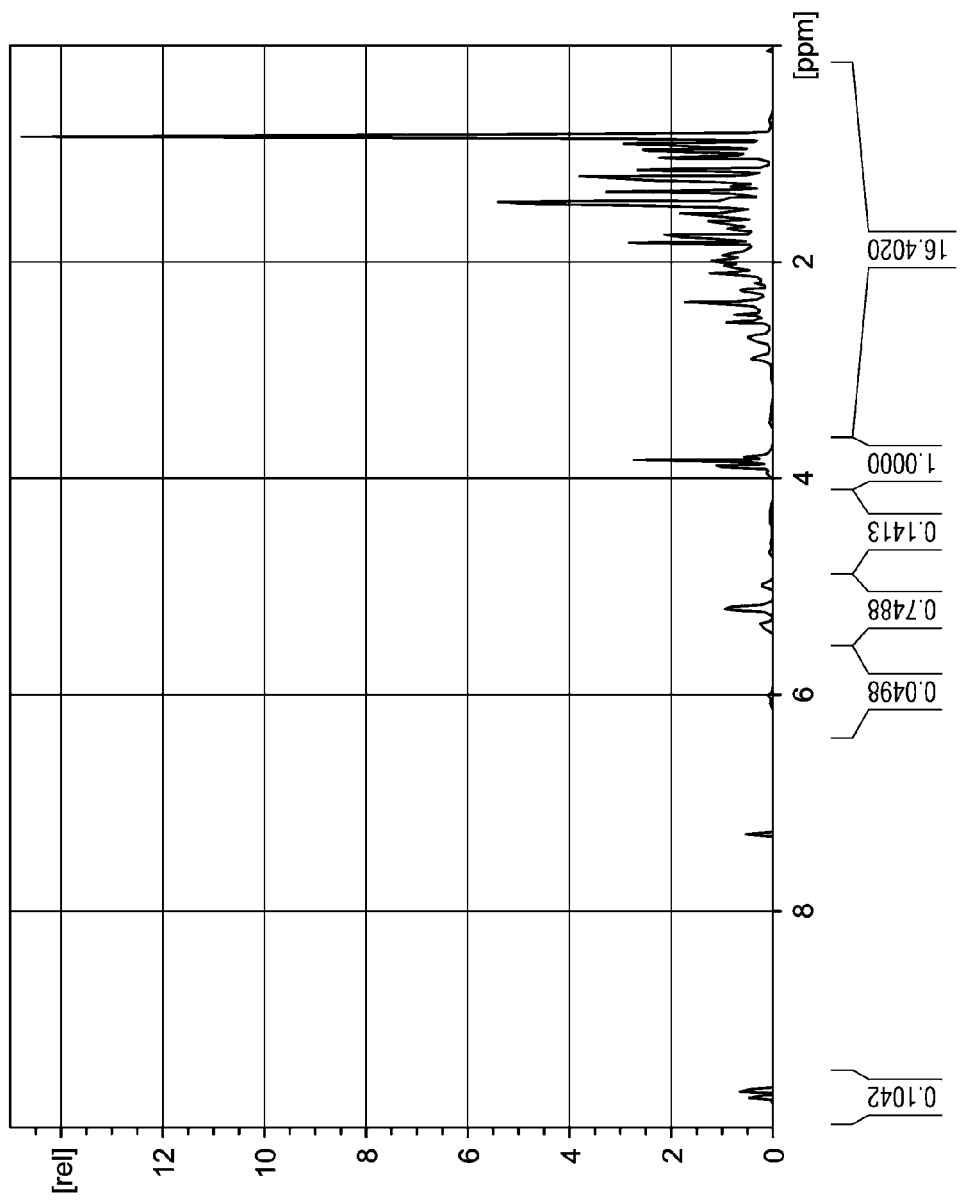
FIG. 2a represents a $^1$H NMR spectrum of $C_9$ oxygenates.
Figure 2B:
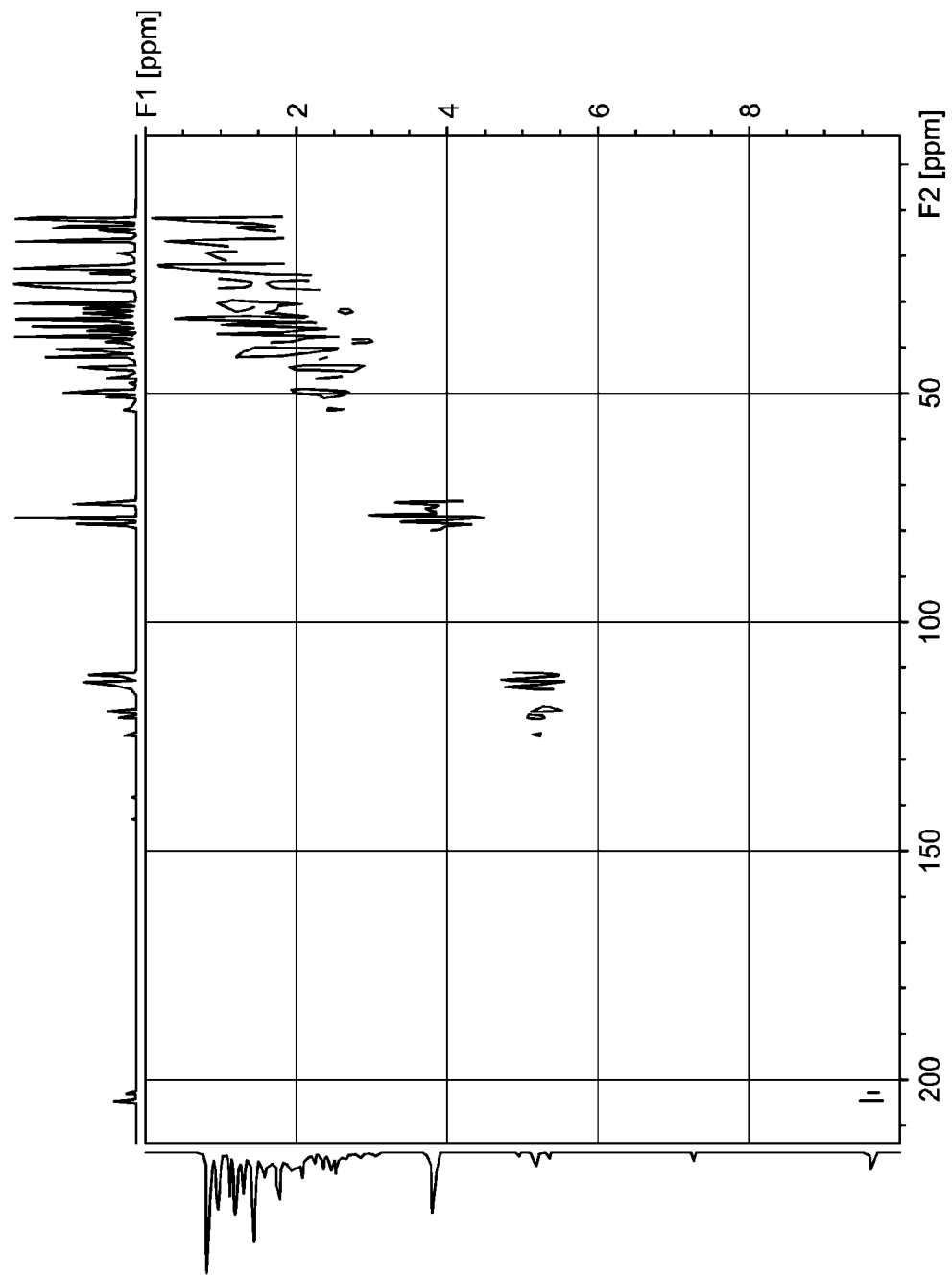
FIG. 2b represents a C—H Correlation NMR of $C_9$ oxygenates.
Figure 2C:
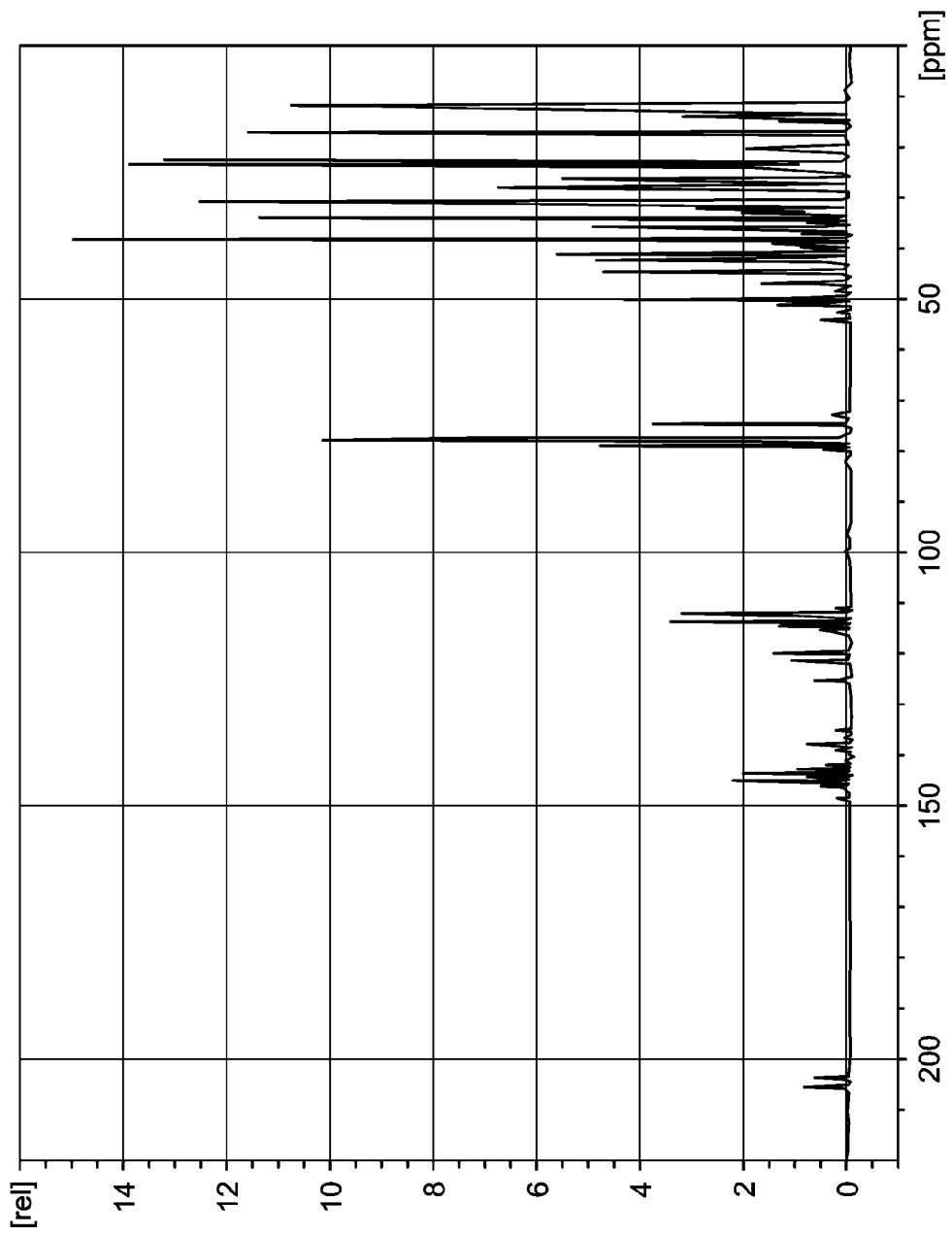
FIG. 2c represents a $^{13}$C NMR of $C_9$ oxygenates.
Figure 2D:
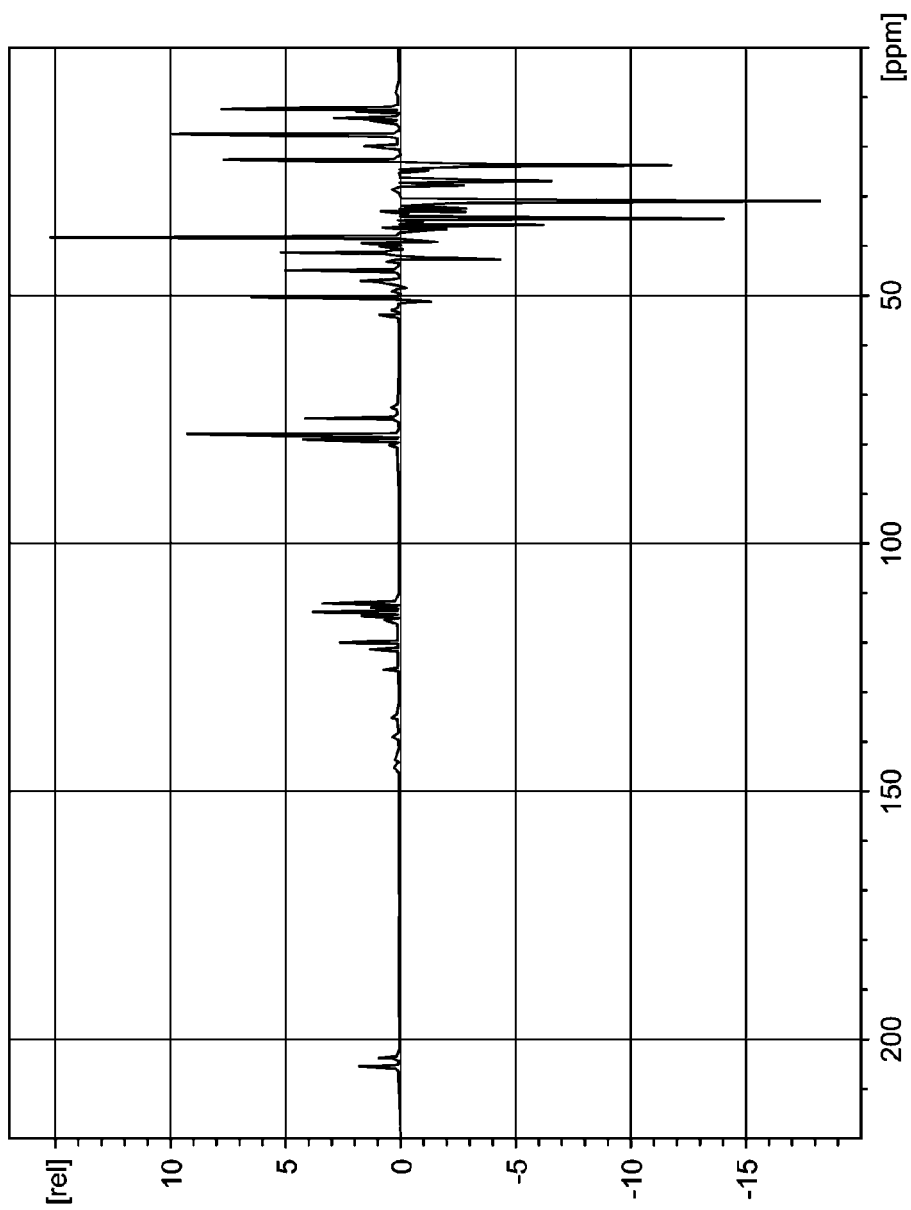
FIG. 2d represents a $^{13}$C DEPT NMR of $C_9$ oxygenates.

A mixture of 44.6 g (50 mL) of ENB, 100 mL of deionized water and 2 mL of concentrated HCl was heated to 80° C. with stirring for 3 days. The HCl is present to mimic the acidic effects of a water-adsorbing molecular sieve and/or typical aluminum alkyl adducts that are difficult to characterize, but that have some acidic character. After cooling to room temperature, the organic layer was separated, washed with aq. sodium bicarbonate and then deionized water. The residual $C_9$ olefins (ENB and its isomers) were removed first from the mixture at room temperature under vacuum. The $C_9$ oxygenates were isolated by distillation using Kugelrohr (50° C./<1 mm) The $C_9$ oxygenates were characterized by $^1H$ as shown in FIG. 2a and $^{13}C$ NMR as shown in FIG. 2b (C—H Correlation NMR), FIG. 2c (C-13 NMR), and FIG. 2d (C-13 NMR DEPT).

Preparation and Characterizations of $C_{18}$ Oxygenates.

Figure 3A:
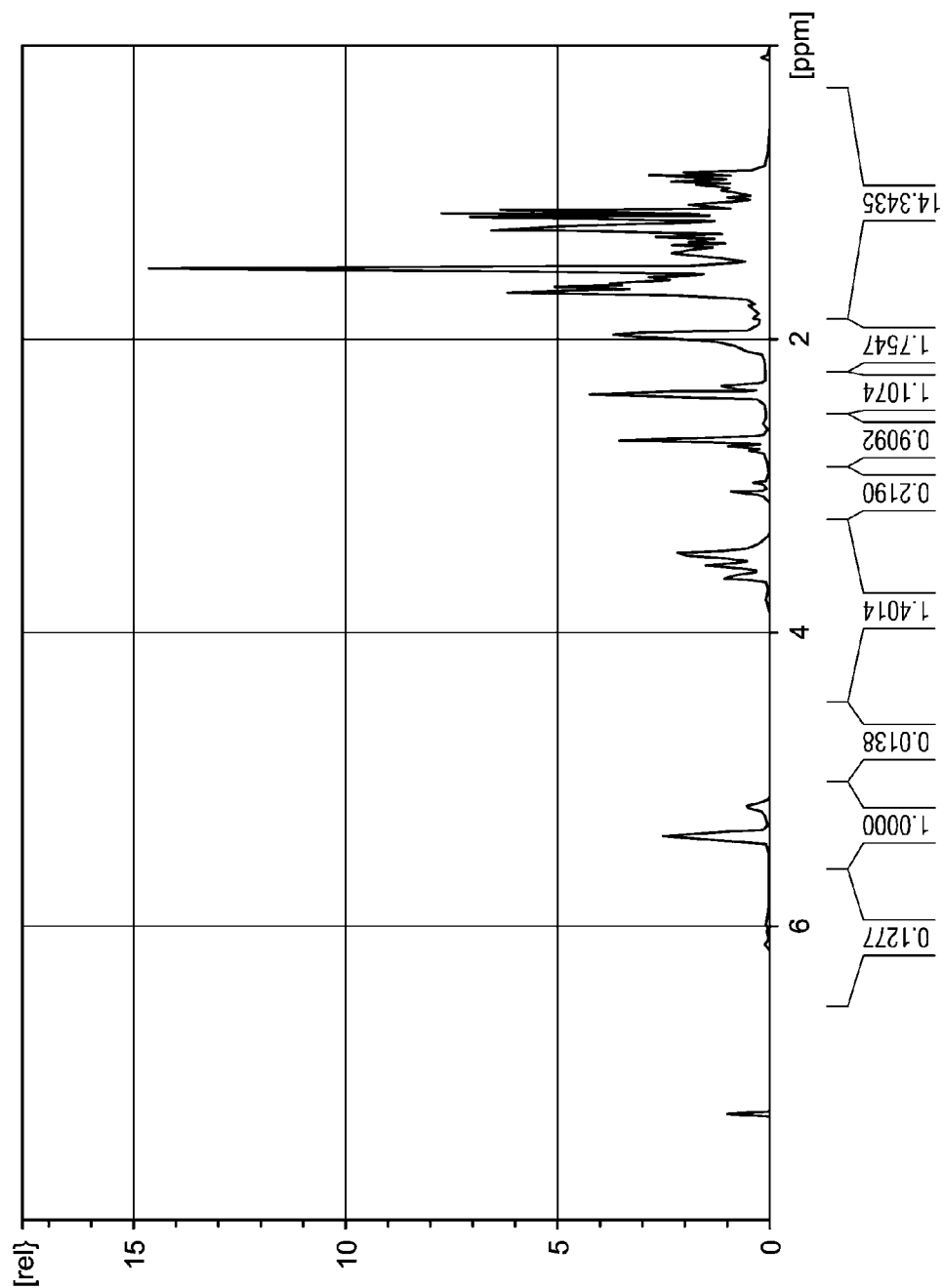
FIG. 3a represents a $^1$H NMR spectrum of $C_{18}$ oxygenates.
Figure 3B:
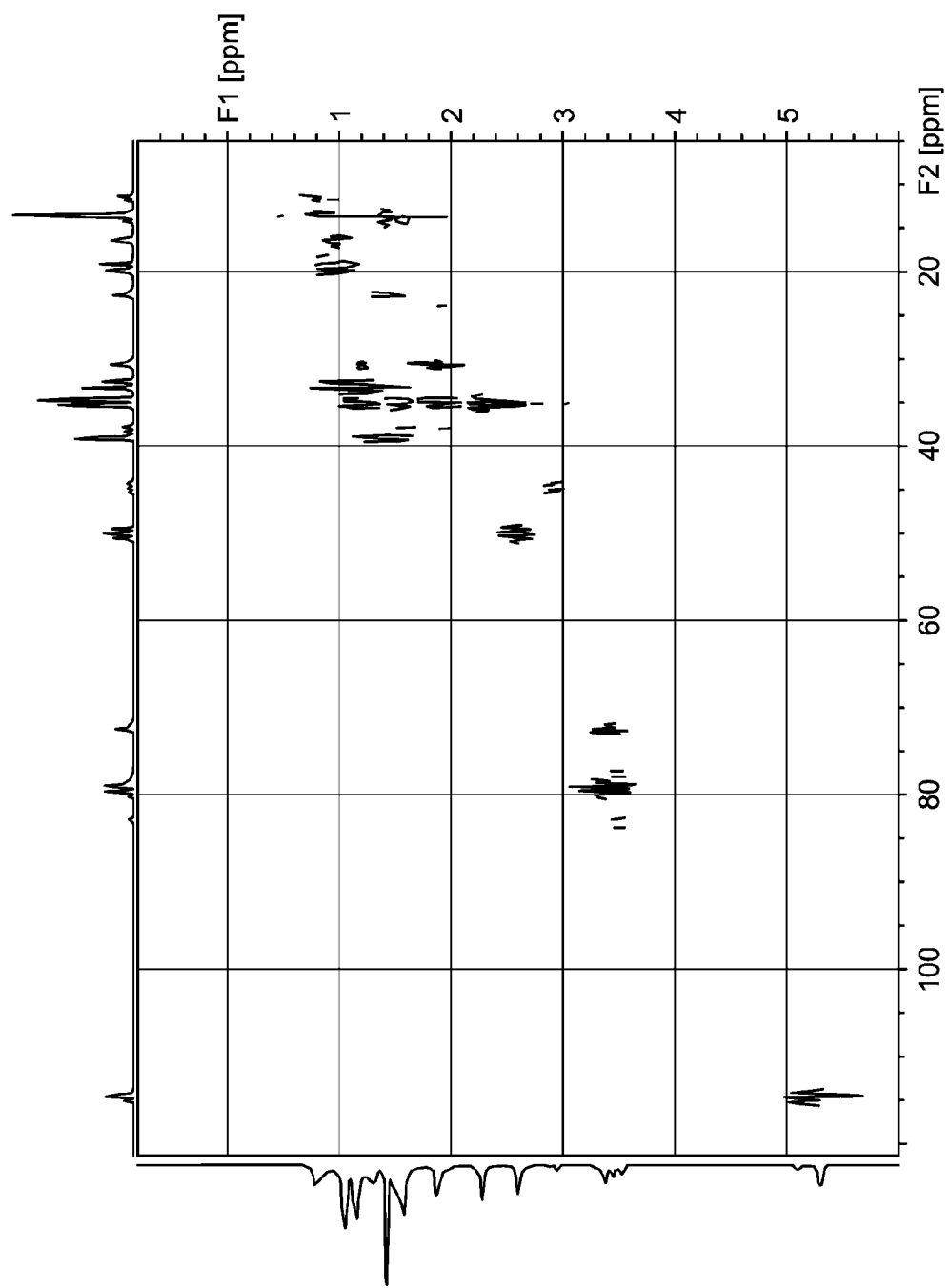
FIG. 3b represents a C—H Correlation NMR of $C_{18}$ oxygenates.
Figure 3C:
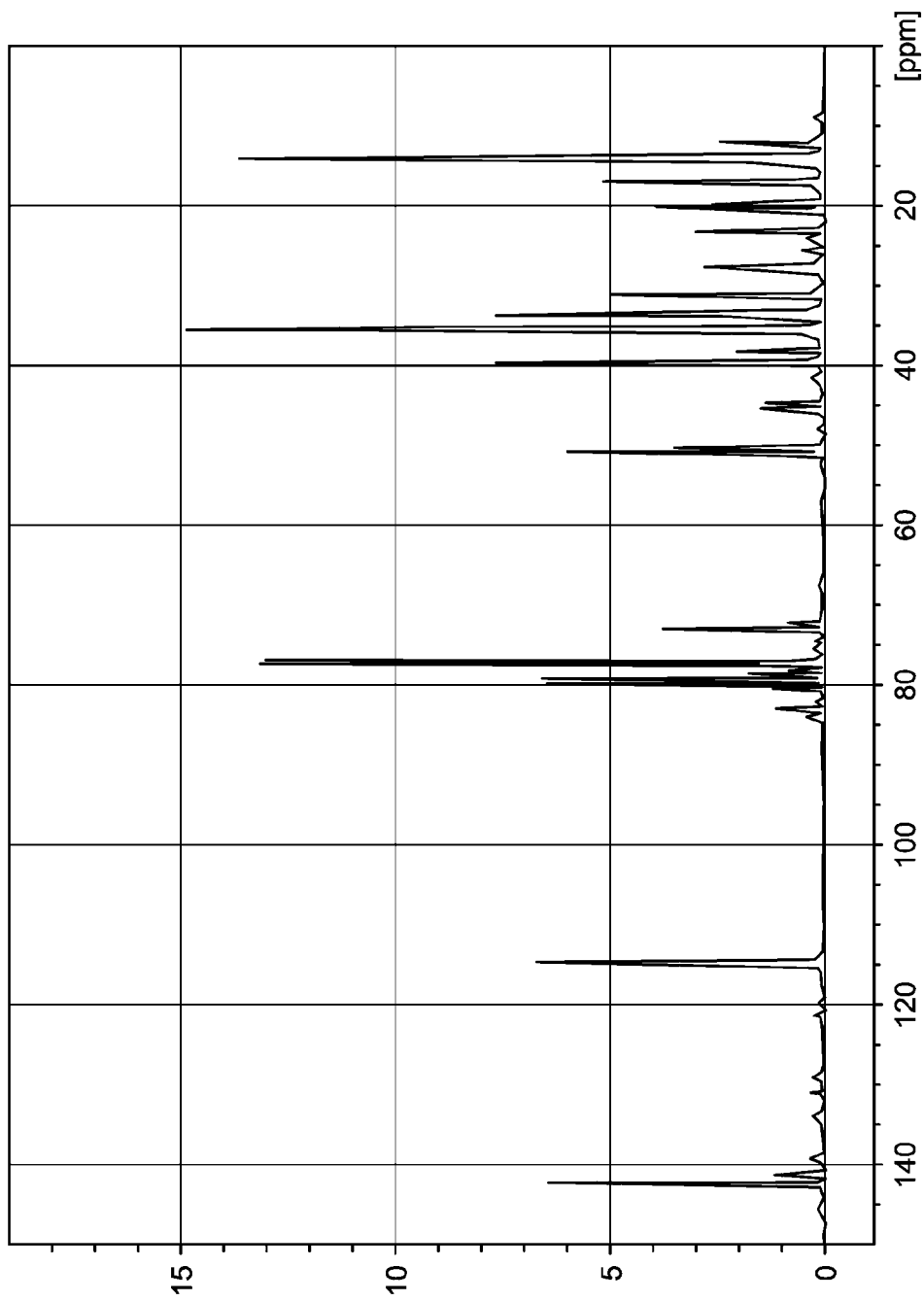
FIG. 3c represents a $^{13}$C NMR of $C_{18}$ oxygenates.
Figure 3D:
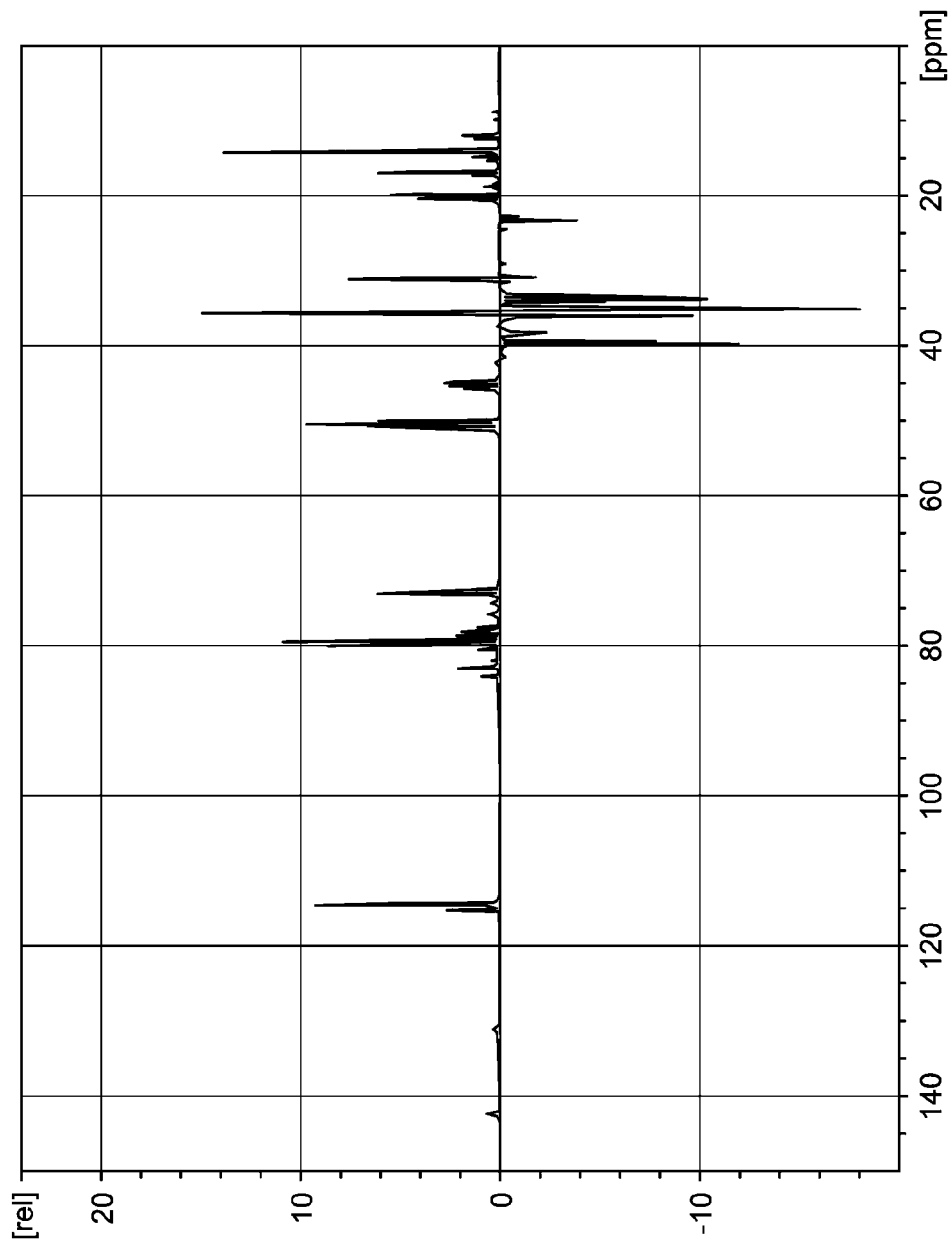
FIG. 3d represents a $^{13}$C DEPT NMR of $C_{18}$ oxygenates.

A mixture of 150 g ENB and 15 g of Y zeolite (Zeolyst CBV-712) was heated to 60° C. with stirring for 3 days. After cooling to room temperature, the mixture was diluted with hexane and filtered. Hexane and $C_9$ olefins (ENB and VNTC) were removed first from the mixture at room temperature under vacuum. The remaining mixture was separated using Kugelrohr to yield 27.1 g $C_{18}$ oxygenates (140° C./<1 mm) The $C_{18}$ oxygenates were characterized by $^1H$ as shown in FIG. 3a and $^{13}C$ NMR as shown in FIG. 3b (C—H Correlation NMR), FIG. 3c (C-13 NMR), and FIG. 3d (C-13 NMR DEPT).

Preparation of Adsorbent.

All materials to be tested as adsorbents were dried at 250° C. overnight in a muffle furnace equipped with nitrogen purge. The dried adsorbents were removed from the furnace while hot and allowed to cool under vacuum and then stored inside a nitrogen filled box. The adsorbents used are described in Table 2.

TABLE 2

| Properties of Adsorbents | |
| --- | --- |
| Adsorbents | Material Type |
| BASF Selexsorb ™ CDO | Alumina |
| BASF S Selexsorb ™ CD | Alumina |
| UOP AZ-300 | Hybrid, Alumina/zeolite |
| 13 X Molecular Sieves | Zeolite |
| 4A Molecular Sieves | Zeolite |
| Saint-Gobain NorPro ™ 6155 | Silica-Alumina |
| BASF Sorbead ™ H/W | Silica |
| BASF Perlkat ™ 97-0 | Silica |

Example 1

Adsorption of $C_9$ Oxygenates and $C_{18}$ Oxygenates at Room Temperature for 30 Minutes The oxygenate solution was prepared by adding known amounts of ENB (ethylidene norbornene), $C_9$ oxygenates, $C_{18}$ oxygenates, and n-hexadecane to anhydrous isohexane. The ENB used in the examples was purchased from Aldrich Chemical Company or obtained from JX Nippon Chemical Texas Inc. The anhydrous isohexane was purchased from Aldrich and further dried over 3A molecular sieves. The solution was analyzed by GC to give a pre-adsorption chromatogram.

To a dried glass vial containing adsorbent was added oxygenate solution containing 910 ppm of $C_9$ oxygenates, 910 ppm of $C_{18}$ oxygenates, and 760 ppm of hexadecane in dried isohexane. The vial was capped under nitrogen and the mixture was stirred at room temperature for 30 minutes. The solution was analyzed by GC to generate a post-adsorption chromatogram. The pre-adsorption chromatograph and post adsorption chromatograph were compared, and the % of $C_9$ and $C_{18}$ oxygenates adsorbed were calculated and recorded in Table 3.

TABLE 3

Adsorption of oxygenates at room temperature for 30 minutes

| Adsorbent | Amount of Solution, cc | Amount of adsorbent, g | % $C_9$ oxygenates adsorbed | % $C_{18}$ oxygenates adsorbed |
| --- | --- | --- | --- | --- |
| Selexsorb CDO | 10 | 1 | 81.0 | 31.3 |
| Sorbead H | 10 | 1 | 91.4 | 59.4 |
| Sorbead ™ R | 10 | 1 | 89.1 | 45.1 |
| Sorbead W | 10 | 1 | 91.3 | 57.5 |
| Perlkat 97-0 | 10 | 1 | 86.0 | 66.8 |
| 13X Molecular Sieve | 10 | 1 | 84.4 | 61.0 |
| 4A Molecular Sieve | 10 | 1 | 38.0 | 9.5 |
| AZ-300 | 10 | 1 | 91.2 | 66.8 |
| NorPro 6155 | 10 | 1 | 89.7 | 70.8 |
| Selexsorb CD | 10 | 1 | 92.2 | 63.2 |

Example 2

Adsorption of Larger Amounts of Oxygenates at Room Temperature for 4 Hours

The oxygenate solution was prepared by adding known amounts of ENB, $C_9$ oxygenates, $C_{18}$ oxygenates and n-hexandecane to anhydrous isohexane. The anhydrous isohexane was purchased from Aldrich and further dried over 3A molecular sieves. The solution was analyzed by GC.

To a dried glass vial containing a specified amount of the adsorbent was added a known amount of the oxygenate solution containing 910 ppm of $C_9$ oxygenates, 910 ppm of $C_{18}$ oxygenates and 760 ppm of hexadecane in dried isohexane. The vial was capped under nitrogen and the mixture was stirred at room temperature for 4 hours. The solution was analyzed by GC and compared to solution before the contact with the adsorbent, data for which is in Table 4.

TABLE 4

Adsorption of Oxygenates for 4 hours

| Adsorbent | Amount of Solution, cc | Amount of adsorbent, g | % $C_9$ oxygenates adsorbed | % $C_{18}$ oxygenates adsorbed |
|---|---|---|---|---|
| Selexsorb CDO | 30 | 1 | 95.5 | 12.1 |
| Selexsorb CDO | 30 | 1 | 97.3 | 13.9 |
| PerlKat 97-0 | 30 | 1 | 82.7 | 56.7 |
| PerlKat 97-0 | 30 | 1 | 84.1 | 62.4 |
| Selexsorb CDO | 30 | 1 | 91.8 | 10.6 |
| Selexsorb CDO | 30 | 1 | 92.0 | 12.7 |
| AZ-300 | 30 | 1 | 96.7 | 22.2 |
| AZ-300 | 30 | 1 | 98.5 | 32.4 |

Example 3

Adsorption of $C_9$ Oxygenates and $C_{18}$ Oxygenates in the Presence of ENB at Room Temperature for 24 Hours The oxygenate solution was prepared by adding known amounts of ENB, $C_9$ oxygenates, $C_{18}$ oxygenates, and n-hexandecane to anhydrous isohexane. The anhydrous isohexane was purchased from Aldrich and further dried over 3A molecular sieves. The solution was analyzed by GC.

To a dried glass vial containing a specified amount of the adsorbent was added a known amount of the oxygenate solution containing 5369 ppm of ENB, 4394 ppm of $C_9$ oxygenates, 1744 ppm of $C_{18}$ oxygenates, and 5270 ppm of hexadecane in dried isohexane. The vial was capped under nitrogen and the mixture was stirred at room temperature for 24 hours. The solution was analyzed by GC and compared to solution before the contact with the adsorbent, as shown in Table 5.

TABLE 5

Adsorption of Oxygenates for 24 hours

| Adsorbent | Amount of Solution, cc | Amount of adsorbent, g | % ENB adsorbed | % $C_9$ oxygenates adsorbed | % $C_{18}$ oxygenates adsorbed |
|---|---|---|---|---|---|
| Selexsorb CDO | 10 | 1 | 10.5 | 99.9 | 62.9 |
| Selexsorb CDO | 10 | 1 | 12.0 | 99.9 | 60.0 |
| AZ-300 | 10 | 1 | 38.5 | 100.0 | 95.6 |
| AZ-300 | 10 | 1 | 40.8 | 100.0 | 96.3 |
| NorPro 6155 | 10 | 1 | 85.4 | 99.1 | 53.2 |
| NorPro 6155 | 10 | 1 | 84.0 | 99.0 | 45.2 |
| PerlKat 97-0 | 10 | 1 | 23.6 | 96.4 | 80.7 |
| PerlKat 97-0 | 10 | 1 | 21.8 | 96.3 | 81.2 |

Example 4

Adsorption of $C_9$ Oxygenates and $C_{18}$ Oxygenates in the Presence of ENB at Room Temperature for 24 Hours The oxygenate solution was prepared by adding known amounts of ENB, $C_9$ oxygenates, $C_{18}$ oxygenates, and n-hexandecane to anhydrous isohexane. The anhydrous isohexane was purchased from Aldrich and further dried over 3A molecular sieves. The solution was analyzed by GC.

To a dried glass vial containing a specified amount of the adsorbent was added a known amount of the oxygenate solution containing 3468 ppm of ENB, 1592 ppm of $C_9$ oxygenates, 851 ppm of $C_{18}$ oxygenates, and 1586 ppm of hexadecane in dried isohexane. The vial was capped under nitrogen and the mixture was stirred at room temperature for 24 hours. The solution was analyzed by GC and compared to solution before the contact with the adsorbent, as in Table 6.

TABLE 6

Adsorption of Oxygenates for 24 hours

| Adsorbent | Amount of Solution, cc | Amount of adsorbent, g | % ENB adsorbed | % $C_9$ oxygenates adsorbed | % $C_{18}$ oxygenates adsorbed |
|---|---|---|---|---|---|
| Selexsorb CDO | 10 | 1 | 5.7 | 100.0 | 68.6 |
| Selexsorb CDO | 10 | 1 | 5.0 | 100.0 | 68.2 |
| Selexsorb CD | 10 | 1 | 100.0 | 100.0 | 37.0 |
| Selexsorb CD | 10 | 1 | 100.0 | 100.0 | 39.4 |
| AZ-300 | 10 | 1 | 38.0 | 100.0 | 98.4 |
| AZ-300 | 10 | 1 | 33.4 | 100.0 | 98.4 |

Example 5

Isomerization, Oligomerization and Hydration of ENB Over 3A Molecular Sieves Example 5 was conducted to illustrate the effectiveness of different 3A molecular sieves for the removal of water. The first three molecular sieves used (Grace Davison Sylobead® 562CS, Zeochem Z3-01, and Zeochem Z3-02) contained "binder" in a spherical form. The other two molecular sieves used (Zeochem Purmol® 3ST and 3STH) were provided in powder form and were binderless and contained only zeolite. A solution was prepared by addition of known amounts of ENB (~5000 ppm) and n-hexandecane (~600 ppm) to anhydrous isohexane. The anhydrous isohexane was purchased from Aldrich and further dried over 3A molecular sieves before use. The solution was analyzed by GC to contain ~4 ppm of VNTC in addition to ENB and n-hexadecane. To a dried glass vial containing 10 g of the 3A molecular sieves was added the ENB solution and 1 g of water. The vial was capped under nitrogen and the mixture was stirred at room temperature for 24 hours. The solution was analyzed by GC and compared to solution before contact with the molecular sieves and water, data for which is in Table 7.

TABLE 7

| 3A Molecular Sieves | Shape | 1-VNTC, ppm Formed from Isomerization of ENB | $C_9$ Oxygenates, ppm Hydration of ENB | $C_{18}$ Oxygenates, ppm Oligomerization and Hydration ENB |
|---|---|---|---|---|
| Grace Davison Sylobead ® 562CS | Sphere | 4.8 | 0 | 0 |
| Zeochem Z3-01 | Sphere | 72 | 0.7 | 81 |
| Zeochem Z3-02 | Sphere | 18 | 0.1 | 3.5 |
| Zeochem Purmol ® 3ST (Zeolite, no binder) | Powder | 4.8 | 0 | 0 |
| Zeochem Purmol ® 3STH (Zeolite, no binder) | Powder | 5.2 | 0 | 0 |

Common 3A/4A/13X molecular sieves can have different amount of acidities depending on the process and binder used. Since oxygenates can form readily from acid catalyzed reaction of ENB and quenching agent (e.g., water or methanol), adsorbent with minimal acidity is preferred for the removal of excess quenching agent in the recycle stream.

Now, having described the various features of the inventive process, disclosed herein in numbered embodiments are:

Embodiment A

A process for polymerization comprising:
(i) providing a recycle stream, wherein the recycle stream comprises quenching agent, one or more $C_6$ to $C_{12}$ conjugated or non-conjugated diene monomers and one or more $C_1$ to $C_{40}$ oxygenates;
(ii) contacting at least a portion of the recycle stream with an adsorbent bed to produce a treated recycle stream, wherein the adsorbent bed comprises at least two adsorbents to remove the quenching agent and/or $C_1$ to $C_{40}$ oxygenates;
(iii) contacting the treated recycle stream with polymerization catalyst to produce a polyolefin product stream;
(iv) quenching the polyolefin product stream with a quenching agent selected from water, a $C_1$ to $C_8$ alcohol, and mixtures thereof, and
(v) separating the quenched polyolefin stream into a polyolefin product and the recycle stream.

Embodiment B

A process for polymerization comprising:
(i) providing a polyolefin product stream, wherein the polyolefin product stream comprises polyolefin product and unreacted monomer;
(ii) quenching the polyolefin product stream with a quenching agent selected from water, a $C_1$ to $C_8$ alcohol (preferably methanol, ethanol, propanol, and/or octanol), and mixtures thereof, to produce a quenched polyolefin stream,
(iii) separating the quenched polyolefin stream into polyolefin product and a recycle stream; and
(iv) contacting at least a portion of the recycle stream with an adsorbent bed to produce a treated recycle stream, wherein the recycle stream comprises quenching agent, one or more $C_6$ to $C_{12}$ conjugated or non-conjugated diene monomers, and one or more $C_1$ to $C_{40}$ oxygenates, and wherein the adsorbent bed comprises at least two adsorbents to remove the quenching agent and/or the $C_1$ to $C_{40}$ oxygenates.

Embodiment C

The process of Embodiment B, wherein the process further comprises (v) contacting the treated recycle stream with a polymerization catalyst to produce a polyolefin product stream.

Embodiment D

The process of any one of Embodiments A to C, further comprising regenerating the adsorbent bed by heating the adsorbent bed to a temperature in the range of from about 150 to about 290° C.

Embodiment E

The process of any one of Embodiments A to D, further comprising subjecting the adsorbent bed to a hot diluent wash prior to and/or after regeneration.

Embodiment F

The process of any one of Embodiments A to E, further comprising sparging the adsorbent bed with hot nitrogen prior to and/or after regeneration.

Embodiment G

The process of any one of Embodiments A to F, wherein one or more of ethylene or $C_3$ to $C_{12}$ alpha-olefin monomers are also contacted with the polymerization catalyst and non-conjugated diene monomer.

Embodiment H

The process of any one of Embodiments A to G, wherein the one or more $C_6$ to $C_{12}$ non-conjugated diene monomers are selected from: 2-methyl-1,4-pentadiene, 3-methyl-1,4-pentadiene, 1,4-hexadiene, 1,5-hexadiene, 2-methyl-1,5-hexadiene 3-methyl-1,4-hexadiene, 4-methyl-1,4-hexadiene, 5-methyl-1,4-hexadiene, 1,5-heptadiene, 1,6-heptadiene, norbornadiene, 3,3-dimethyl-1,3-hexadiene, 4-ethyl-1,4-hexadiene, 5-methyl-1,4-heptadiene, 6-methyl-1,4-heptadiene, 1-vinylcyclohexene, 5-methylene-2-norbornene, 1,6-octadiene, 1,7-octadiene, 1,9-octadiene, 1,7-nondiene, 1,8-nonadiene, 5-vinyl-2-norbornene, 5-ethylidene-2-norbornene, 5-ethyl-1,4-heptadiene, 5-ethyl-1,5-heptadiene, 4-methyl-1,4-octadiene, 5-methyl-1,4-octadiene, 5-methyl-1,5-octadiene, 6-methyl-1,5-octadiene, 6-methyl-1,6-octadiene, 7-methyl-1,6-octadiene, 1,8-decadiene, 1,9-decadiene, 1,4-divinylcyclohexane, 1,3-divinylcyclohexane, dicyclopentadiene, 3,7-dimethyl-1,6-octadiene, 5,7-dimethyl-1,6-octadiene, 4-ethyl-1,4-octadiene, 5-ethyl-1,4-octadiene, 5-ethyl-1,5-octadiene, 6-ethyl-1,5-octadiene, 6-ethyl-1,6-octadiene, 4-methyl-1,4-nonadiene, 5-methyl-1,4-nonadiene, 5-methyl-1,5-nonadiene, 6-methyl-1,5-nonadiene, 6-methyl-1,6-nonadiene, 7-methyl-1,6-nonadiene, 7-methyl-1,7-nonadiene, 5-allyl-2-norbornene, 1,10-undecadiene, 6-propyl-1,6-octadiene, 4-ethyl-1,4-nonadiene, 5-ethyl-1,4-nonadiene, 5-ethyl-1,5-nonadiene, 6-ethyl-1,5-nonadiene, 6-ethyl-1,6-nonadiene, 7-ethyl-1,6-nonadiene, 5-methyl-1,4-decadiene, 5-methyl-1,5-decadiene, 6-methyl-1,5-decadiene, 6-methyl-1,6-decadiene, 7-methyl-1,6-decadiene, 7-methyl-1,7-decadiene, 8-methyl-1,7-decadiene, 8-methyl-1,8-decadiene, 9-methyl-1,8-decadiene, 1,11-dodecadiene, 6-butyl-1,6-octadiene, 5-ethyl-1,4-decadiene, 5-ethyl-1,5-decadiene, 6-ethyl-1,5-decadiene, 6-ethyl-1,6-decadiene, 7-ethyl-1,6-decadiene, 7-ethyl-1,7-decadiene, 8-ethyl-1,7-decadiene, 8-ethyl-1,8-decadiene, 6-methyl-1,6-undecadiene, 8-methyl-1,6-undecadiene, and combinations thereof.

Embodiment I

The process of any one of Embodiments A to H, where the quenching agent comprises water.

Embodiment J

The process of any one of Embodiments A to I, where the quenching agent comprises methanol, ethanol, propanol, octanol, or mixtures thereof.

Embodiment K

The process of any one of Embodiments A or J, wherein the adsorbent bed comprises at least one adsorbent to remove quenching agent and at least one adsorbent to remove $C_1$ to $C_{40}$ oxygenates.

Embodiment L

The process of any one of Embodiments A to K, wherein at least one of the two adsorbents is a solid and has a surface area within the range of from 50 or 80 or 120 or 150 or 200 or 250 or 300 or 350 $m^2/g$ to 400 or 500 or 600 or 800 or 1000 $m^2/g$.

Embodiment M

The process of any one of Embodiments A to L, wherein at least one of the two adsorbents is a solid and has a surface area of from about 250 to about 600 $m^2/g$, or from about 300 to about 500 $m^2/g$, or from about 350 to about 450 $m^2/g$.

Embodiment N

The process of any one of Embodiments A to M, wherein at least one of the two adsorbents is a solid and has a surface area of from about 80 to about 400 $m^2/g$, or from about 100 to about 350 $m^2/g$, or from about 120 to about 300 $m^2/g$.

Embodiment O

The process of any one of Embodiments A to N, wherein at least one of the two adsorbents is a solid and has an average pore volume within the range of from 0.2 or 0.4 or 0.6 ml/g to 0.88 or 1.0 or 1.4 or 1.6 or 2.0 ml/g.

Embodiment P

The process of any one of Embodiments A to O, wherein at least one adsorbent is a zeolitic molecular sieve and at least one adsorbent is a hybrid zeolite in alumina.

Embodiment Q

The process of Embodiment P, wherein the zeolitic molecular sieve comprises material selected from the group consisting of zeolite X, zeolite Y, zeolite A, faujasite, mordenite, ferrierite, and mixtures thereof.

Embodiment R

The process of Embodiment P or Q, wherein the hybrid zeolite in alumina has a surface area within the range of from 60 or 80 $m^2/g$ to 110 or 120 or 140 $m^2/g$ and a pore volume within the range of from 0.30 or 0.35 or 0.40 ml/g to 0.48 or 0.50 or 0.54 ml/g.

Embodiment S

The process of any one of Embodiments P to R, wherein the zeolitic molecular sieve is binderless.

Embodiment T

The process of Embodiment S, wherein the zeolitic molecular sieve contains less than 10 wt % binder.

Embodiment U

The process of any one of Embodiments P to T, wherein the hybrid zeolite in alumina adsorbent removes oxygenates selected from $C_8$ to $C_{40}$ oxygenates, $C_8$ to $C_{30}$ oxygenates, $C_{12}$ to $C_{40}$ oxygenates, and $C_{12}$ to $C_{30}$ oxygenates.

Embodiment V

The process of any one of Embodiments P to U, further comprising an alumina adsorbent.

Embodiment W

The process of Embodiment V, wherein the alumina adsorbent is selected from calcined alumina, low soda alumina, reactive alumina, tabular alumina, fused alumina, high purity alumina, transition metal substituted alumina, silica/alumina, and mixtures thereof.

Embodiment X

The process of any one of Embodiments P to W, wherein the adsorbent bed further comprises at least one silica adsorbent.

Embodiment Y

The process of Embodiment X, wherein the silica adsorbent is selected from fused quartz, crystal silica, fumed silica, colloidal silica, silica gel, aerogel, transition metal substituted silica, high purity silica, and mixtures thereof.

Embodiment Z

The process of any one of Embodiments A to Y, wherein the $C_1$ to $C_{40}$ oxygenates are selected from $C_1$ to $C_{30}$ oxygenates, $C_4$ to $C_{40}$ oxygenates, and $C_4$ to $C_{30}$ oxygenates, $C_8$ to $C_{40}$ oxygenates, $C_8$ to $C_{30}$ oxygenates, $C_{12}$ to $C_{30}$ oxygenates, and $C_{12}$ to $C_{40}$ oxygenates.

Embodiment AA

The process of any one of Embodiments A to Z, wherein the oxygenates are $C_9$ and $C_{18}$ oxygenates or $C_{10}$ and $C_{19}$ oxygenates.

Embodiment AB

The process of any one of Embodiments A to AA, wherein the recycle stream comprises one or more of $C_9$ and $C_{18}$ oxygenates or $C_{10}$ and $C_{19}$ oxygenates, before contact with the adsorbent bed.

Embodiment AC

The process of any one of Embodiments A to AB, wherein the quenching agent is a $C_m$ alcohol, where m is an integer equal to the number of carbon atoms in the alcohol, and where the $C_1$ to C40 oxygenate is a $C_{m+n}$, where m is the m from the $C_m$ alcohol, and where n is an integer from 6 to 32.

Embodiment AD

The process of any one of Embodiments A to AC, wherein the recycle stream has 50 wt % more $C_1$ to $C_{40}$ oxygenates than the treated recycle stream.

Embodiment AE

The process of any one of Embodiments A to AD, wherein the recycle stream has 65 wt % more $C_4$ to $C_{40}$ oxygenates than the treated recycle stream.

Embodiment AF

The process of any one of Embodiments A to AE, wherein the recycle stream, after contact with the adsorbent bed, comprises 10 ppm or less $C_4$ to $C_{40}$ oxygenates.

Embodiment AG

The process of any one of Embodiments A to AF, wherein when the recycle stream is in contact with the adsorbent bed, from 70 to 99 wt %, or from 80 to 95 wt %, of the $C_{18+m}$ oxygenates are absorbed and from 10 to 45 wt %, or from 15 to 40 wt %, or from 20 to 35 wt %, of the non-conjugated dienes are absorbed by the at least two adsorbents, where m is equal to the number of carbon atoms in the quenching agent.

Embodiment AH

The process of any one of Embodiments A to AG, wherein from 80 to 100 wt %, or from 85 to 99 wt %, or from 90 to 95 wt %, of the $C_{9+m}$ oxygenates are adsorbed, where m is equal to the number of carbon atoms in the quenching agent.

Embodiment AI

The process of any one of Embodiments A to AH, wherein the residence time of the recycle stream with the at least two adsorbents is within the range of from 5 or 8 minutes to 12 or 15 or 20 minutes; or, wherein the residence time for the recycle stream with each of the adsorbents, individually, is within the range of from 4 or 6 minutes to 10 or 14 or 18 minutes.

Embodiment AJ

The process of any one of Embodiments A to AI, wherein the oxygenate is the reaction product of a $C_6$ to $C_{12}$ non-conjugated diene monomer, the quenching agent, and an aluminum alkyl adduct and/or a zeolitic molecular sieve.

Embodiment AK

The process of any one of Embodiments A to AJ, wherein the recycle stream first contacts the at least one adsorbent provided to remove water, followed by the recycle stream, having water removed, contacting the at least one other adsorbent provided to remove $C_8$ or $C_{12}$ to $C_{30}$ or $C_{40}$ oxygenates.

The invention claimed is:

1. A process for polymerization comprising:
    (i) providing a polyolefin product stream, wherein the polyolefin product stream comprises polyolefin product and unreacted monomer;
    (ii) quenching the polyolefin product stream with a quenching agent selected from water, a $C_1$ to $C_8$ alcohol, and mixtures thereof, to produce a quenched polyolefin stream,
    (iii) separating the quenched polyolefin stream into polyolefin product and a recycle stream; and
    (iv) contacting at least a portion of the recycle stream with an adsorbent bed to produce a treated recycle stream, wherein the recycle stream comprises quenching agent, one or more $C_6$ to $C_{12}$ conjugated or non-conjugated diene monomers, and one or more $C_1$ to $C_{40}$ oxygenates, and wherein the adsorbent bed comprises at least two adsorbents to remove the quenching agent and/or the $C_1$ to $C_{40}$ oxygenates.

2. The process of claim 1, wherein the adsorbent bed comprises at least one adsorbent to remove water and at least one other adsorbent to remove $C_8$ to $C_{40}$ oxygenates.

3. The process of claim 1, wherein at least one adsorbent is a zeolitic molecular sieve and at least one adsorbent is a hybrid zeolite in alumina.

4. The process of claim 3, wherein the hybrid zeolite in alumina adsorbent removes $C_8$ to $C_{40}$ oxygenates.

5. The process of claim 3, wherein the adsorbent bed further comprises an alumina adsorbent.

6. The process of claim 3, wherein the adsorbent bed further comprises at least one silica adsorbent.

7. The process of claim 3, wherein the zeolitic molecular sieve comprises material selected from the group consisting of zeolite X, zeolite Y, zeolite A, faujasite, mordenite, ferrierite, and mixtures thereof.

8. The process of claim 3, wherein the zeolitic molecular sieve is binderless.

9. The process of claim 1, wherein the one or more $C_6$ to $C_{12}$ non-conjugated diene monomers are selected from the group consisting of: 2-methyl-1,4-pentadiene, 3-methyl-1,4-pentadiene, 1,4-hexadiene, 1,5-hexadiene, 2-methyl-1,5-hexadiene 3-methyl-1,4-hexadiene, 4-methyl-1,4-hexadiene, 5-methyl-1,4-hexadiene, 1,5-heptadiene, 1,6-heptadiene, norbornadiene, 3,3-dimethyl-1,3-hexadiene, 4-ethyl-1,4-hexadiene, 5-methyl-1,4-heptadiene, 6-methyl-1,4-heptadiene, 1-vinylcyclohexene, 5-methylene-2-norbornene, 1,6-octadiene, 1,7-octadiene, 1,9-octadiene, 1,7-nondiene, 1,8-nonadiene, 5-vinyl-2-norbornene, 5-ethylidene-2-norbornene, 5-ethyl-1,4-heptadiene, 5-ethyl-1,5-heptadiene, 4-methyl-1,4-octadiene, 5-methyl-1,4-octadiene, 5-methyl-1,5-octadiene, 6-methyl-1,5-octadiene, 6-methyl-1,6-octadiene, 7-methyl-1,6-octadiene, 1,8-decadiene, 1,9-decadiene, 1,4-divinylcyclohexane, 1,3-divinylcyclohexane, dicyclopentadiene, 3,7-dimethyl-1,6-octadiene, 5,7-dimethyl-1,6-octadiene, 4-ethyl-1,4-octadiene, 5-ethyl-1,4-octadiene, 5-ethyl-1,5-octadiene, 6-ethyl-1,5-octadiene, 6-ethyl-1,6-octadiene, 4-methyl-1,4-nonadiene, 5-methyl-1,4-nonadiene, 5-methyl-1,5-nonadiene, 6-methyl-1,5-nonadiene, 6-methyl-1,6-nonadiene, 7-methyl-1,6-nonadiene, 7-methyl-1,7-nonadiene, 5-allyl-2-norbornene, 1,10-undecadiene, 6-propyl-1,6-octadiene, 4-ethyl-1,4-nonadiene, 5-ethyl-1,4-nonadiene, 5-ethyl-1,5-nonadiene, 6-ethyl-1,5-nonadiene, 6-ethyl-1,6-nonadiene, 7-ethyl-1,6-nonadiene, 5-methyl-1,4-decadiene, 5-methyl-1,5-decadiene, 6-methyl-1,5-decadiene, 6-methyl-1,6-decadiene, 7-methyl-1,6-decadiene, 7-methyl-1,7-decadiene, 8-methyl-1,7-decadiene, 8-methyl-1,8-decadiene, 9-methyl-1,8-decadiene, 1,11-dodecadiene, 6-butyl-1,6-octadiene, 5-ethyl-1,4-decadiene, 5-ethyl-1,5-decadiene, 6-ethyl-1,5-decadiene, 6-ethyl-1,6-decadiene, 7-ethyl-1,6-decadiene, 7-ethyl-1,7-decadiene, 8-ethyl-1,7-decadiene, 8-ethyl-1,8-decadiene, 6-methyl-1,6-undecadiene, 8-methyl-1,6-undecadiene, and combinations thereof.

10. The process of claim 1, wherein the recycle stream comprises one or more of $C_9$ and $C_{18}$ oxygenates, before contact with the adsorbent bed.

11. The process of claim 1, wherein the recycle stream has 50 wt % more $C_4$ to $C_{40}$ oxygenates than the treated recycle stream.

12. The process of claim 11, wherein the recycle stream has 65 wt % more $C_4$ to $C_{40}$ oxygenates than the treated recycle stream.

13. The process of claim 1, wherein the quenching agent is water and the oxygenates are $C_9$ and $C_{18}$ oxygenates.

14. The process of claim 1, wherein the quenching agent is a $C_m$ alcohol, where m is an integer equal to the number of carbon atoms in the alcohol, and where the $C_1$ to $C_{40}$ oxygenate is a $C_{m+n}$, where m is the m from the $C_m$ alcohol, and where n is an integer from 6 to 32.

15. The process of claim 1, wherein the recycle stream, after contact with the adsorbent bed, comprises 10 ppm or less $C_4$ to $C_{40}$ oxygenates.

16. The process of claim 1, further comprising regenerating the adsorbent bed by heating the adsorbent bed to a temperature in the range of from about 150 to about 290° C.

17. The process of claim 1, further comprising subjecting the adsorbent bed to a hot diluent wash prior to and/or after regeneration.

18. The process of claim 1, further comprising sparging the adsorbent bed with hot nitrogen prior to and/or after regeneration.

19. The process of claim 1, wherein when the recycle stream is in contact with the adsorbent bed, from 70 wt % to 99 wt % of the $C_{18}$ oxygenates are absorbed and from 10 wt % to 45 wt % of the non-conjugated dienes are absorbed by the at least two adsorbents.

20. The process of claim 1, wherein at least one of the adsorbents is a hybrid zeolite in alumina and has a surface area within the range of from 60 $m^2$/g to 140 $m^2$/g and a pore volume within the range from 0.30 ml/g to 0.54 ml/g.

21. The process of claim 1, wherein the residence time of the recycle stream with the at least two adsorbents is within the range of from 5 to 20 minutes.

22. The process of claim 1, wherein the residence time for the recycle stream with each of the adsorbents, individually, is within the range of from 4 to 18 minutes.

23. The process of claim 1, wherein the oxygenate is the reaction product of a $C_6$ to $C_{12}$ non-conjugated diene monomer, the quenching agent, and an aluminum alkyl adduct or a zeolitic molecular sieve.

24. The process of claim 1, wherein the quenching agent is water and the recycle stream first contacts the at least one adsorbent provided to remove water, followed by the recycle stream having water removed contacting the at least one other adsorbent provided to remove $C_8$ to $C_{40}$ oxygenates.

* * * * *